United States Patent
Ali et al.

(10) Patent No.: US 7,120,170 B2
(45) Date of Patent: Oct. 10, 2006

(54) METHOD AND APPARATUS FOR THE TIME SYNCHRONIZATION IN A DATA COMMUNICATION SYSTEM

(75) Inventors: Irfan Ali, Northbrook, IL (US); Wesley Stuart Jones, Palatine, IL (US)

(73) Assignee: Motorola, Inc., Schaumburg, IL (US)

( * ) Notice: Subject to any disclaimer, the term of this patent is extended or adjusted under 35 U.S.C. 154(b) by 971 days.

(21) Appl. No.: 10/027,045

(22) Filed: Dec. 20, 2001

(65) Prior Publication Data

US 2003/0118056 A1    Jun. 26, 2003

(51) Int. Cl.
*H04J 3/08* (2006.01)
(52) U.S. Cl. ....................... 370/503; 370/507
(58) Field of Classification Search ............ None
See application file for complete search history.

(56) References Cited

U.S. PATENT DOCUMENTS 5,726,989 A * 3/1998 Dokic ................. 370/509
6,243,395 B1 * 6/2001 Fujimori et al. ............ 370/466
6,246,701 B1 * 6/2001 Slattery ....................... 370/503
2002/0001351 A1 * 1/2002 Morimoto et al. ..... 375/240.28

* cited by examiner

*Primary Examiner*—Doris H. To
*Assistant Examiner*—Robert W. Wilson

(57) ABSTRACT

A common clock shared by two or more nodes within a network used for time-synchronization. The nodes communicate via a packetized data transmission. Each data packet has a header with a value. The clock includes a first timing portion that includes at least two data packets where the value is constant for each data packet, and a second timing portion that includes at least two data packets where the value is constant for each data packet but different from the value of the data packets in the first timing portion. Alternatively, the clock includes a first timing portion that includes at least two data packets where the value changes with each data packet, and one or more subsequent timing portions each including at least two data packets where the value is constant for each data packet within a subsequent timing portion but changes with each of the subsequent timing portions.

19 Claims, 4 Drawing Sheets

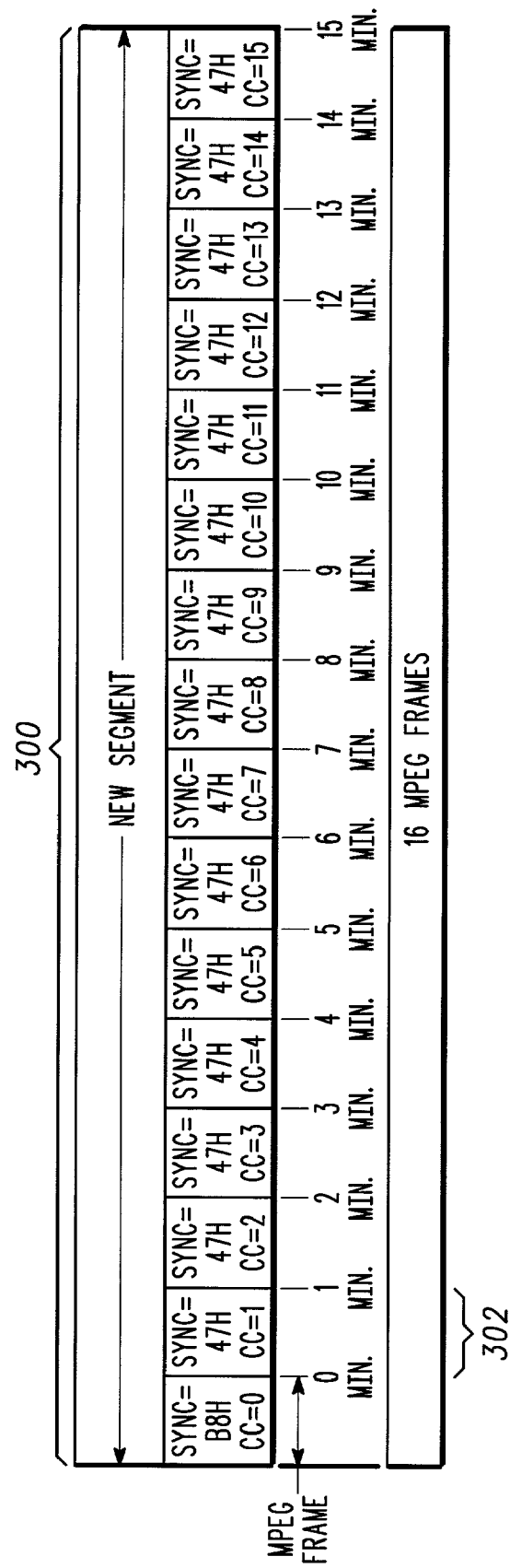

METHOD AND APPARATUS FOR THE TIME SYNCHRONIZATION IN A DATA COMMUNICATION SYSTEM

TECHNICAL FIELD

The present invention relates generally to communication systems, and more particularly to a method and apparatus for synchronizing nodes within a network or broadband communication systems.

BACKGROUND OF THE ART

In all shared communication systems having bandwidth limitations, there is a need for time synchronization to efficiently use the bandwidth resources that are available on the system. The nodes within the communication system need to be synchronized to each other to determine the boundaries of their allocated transmission slot, as determined by the media access scheme being utilized. For example, mobile units within a wireless communication network need to be synchronized with a base-station to aid the mobile units in the channel access method being used. Such channel access methods may include Time Division Multiple Access (TDMA), Code Division Multiple Access (CDMA), Frequency Division Multiple Access (FDMA), demand-assignment schemes (DA/TDMA, DA/CDMA, DA/FDMA), priority-oriented access, or any other methods of allocating access to a data stream on a shared bandwidth. For 3rd and 4th Generation cellular communication systems, the multiple-access schemes may include Enhanced Datarates for GSM Evolution (EDGE) and Wideband Code Division Multiple Access (WCMDA).

One manner of synchronizing nodes within a network includes having all the nodes on a common clock. For example, if TDMA is used for channel access in wireless communications, the mobile units need to be synchronized to a common clock to determine what the time-slot boundaries are and what are the allocated time slots for the mobile unit. In a further example, if demand assignment is used for channel access, the mobile units need to be synchronized to a common clock so that the base-station can assign them an appropriate schedule for transmission. Virtually all other types of media access schemes require some form of synchronization in order to communicate with other nodes, such as between computers in a network or between a basestation and mobile units in a cellular network.

Most wireless systems and other communication systems synchronize the nodes by using preambles. Preambles are a special pattern of bits that are transmitted at the beginning of a transmission (e.g., during the registration process) as part of the physical layer. These preambles are recognized by the nodes causing them to synchronize their internal clocks to the same time. However, the use of preambles requires special purpose hardware in order to recognize the special bit pattern and synchronize the transmission. The cost of such specialty hardware is generally greater than the cost of "over-the-counter" chips available on the open market and in mass quantity. Thus the cost of the devices in which these chips are implemented and which use preambles for synchronization is increased. Furthermore, this method of synchronization requires the receiving node to be synchronized at the beginning of the transmission, since the preamble is not repeated elsewhere during the transmission. If the node loses synchronization during the transmission or fails to read the preamble at the beginning of the transmission, then the node is unable to synchronize or re-synchronize and may end up losing the connection.

Another manner of synchronizing nodes in a network includes transmitting timing information within the message. However, adding timing information to the original message increases the amount of data that needs to be transmitted. For example, a message may be transmitted in a series of data packets. Each data packet may include a header and a packet payload. The header provides various instructions on how to read the message. The packet payload carries the content that is being transmitted from one node to another. A time stamp may be added by the transmitting node to the packet payload which is then read by the receiving node. The receiving node may then adjust its internal clock to the time indicated by the time stamp and synchronize with the transmitting node. However, placing a time stamp in the packet payload leaves less room for the content of the transmission. Thus, it takes longer for the transmission to be completed and makes the connection less efficient. Other synchronization schemes, such as including timing information in a broadcast as used by the Multimedia Cable Network Systems (MCNS) group, may be somewhat complicated thereby requiring more computing power or specialized chips.

Furthermore, it is expected that 3rd and 4th generation mobile communication networks and broadband wireless systems will communicate using speeds of between a few hundred kilobits per second to a few megabits per second. This allows high-speed transmission of various media types that are generally embodied in large data files, such as high-resolution photos, real-time videos, music, etc. This means a vast increase in the amount of data that may be sent over a wireless system. 3rd and 4th generation systems will also need to allocate resources among a limited bandwidth at a greater efficiency given the increase in the amount of data that is being transmitted.

In addition, many computers communicate over a broadband communication system using, for example, cable modems, Ethernet, digital subscriber line (DSL), etc. However, the bandwidth resources of a broadband communication system for computers are also limited, and a media access scheme needs to be used to allocate those resources efficiently. In order to implement the media access scheme for the computers, the computers need to be synchronized with a server or another system that allocates the resources. Much of the information being transmitted is done using the MPEG transmission format, so many of the modems that are used are also implemented with MPEG standard hardware. However, synchronization is often done according to the methods described above, thereby creating the same disadvantages.

Currently, it is expected that these transmissions will use the MPEG-2 transmission format. For example, both the European standard, Digital Video Broadcast (DVB), and the American standard for wireless video transmission uses MPEG-2 frames for transporting video information. MPEG is also applicable in point-to-multipoint wireless system operating in the Multi-channel Multi-point Distribution Service (MMDS) or Local Multi-point Distribution Service (LMDS) frequency bands. In addition, MPEG is applicable to broadband cable, optical fiber systems, or other highspeed hard-wire systems. Thus, many communication devices may be implemented with MPEG standard hardware for (de)multiplexing MPEG frames, thereby reducing the costs of these chips as they become more widespread. In addition, 4th generation systems may be designed to use the modulation and coding schemes used by DVB (i.e., ITU J.83

Annex A/Annex B specifications). Many cable modem products also use the ITU J.83 Annex A specification for the physical layer.

Thus there is a need for a method and apparatus that can implement time synchronization among multiple nodes in a communication system and reuse the transmission hardware within the node. There is also a need for a method and apparatus that can provide a common clock for time synchronization without requiring further information to be added to the data stream which sacrifices space for the content.

BRIEF DESCRIPTION OF THE DRAWINGS

FIG. 5 is a timeline of a common clock according to a further embodiment.

DESCRIPTION OF THE PREFERRED EMBODIMENTS

The invention is directed to a clock shared by two or more nodes via a data transmission. The data transmission may include a plurality of data packets where each data packet has a header containing a value. In accordance with one aspect of the invention, the clock includes a first timing portion of at least two data packets wherein the value is constant for each data packet in the first timing portion, and a second timing portion of at least two data packets wherein the value is constant for each data packet in the second timing portion but different from the value for each data packet in the first timing portion.

In accordance with another aspect of the invention, a clock includes a first timing portion of at least two data packets wherein the value changes with each data packet in the first timing portion, and one or more subsequent timing portions each of at least two data packets wherein the value is constant for each data packet within a subsequent timing portion and changes with each of the one or more subsequent timing portions.

The invention is also directed to a method of time-synchronization between two or more nodes via a clock embedded within a data communication. The clock is provided by at least one time segment each having a plurality of timing portions, where each timing portion includes two or more data packets, and each data packet has a header containing a value that changes with each timing portion. In accordance with still another aspect of the invention, the method includes receiving a data packet and reading the value within the header of the data packet. The value is compared with at least one previous value from at least one previous data packet to provide a result. The position of the clock is determined based on the result.

In accordance with yet another aspect of the invention, the method includes receiving information on the length of the time segment and determining the boundary of each time segment based on the information. A first data packet is received and a first value within the header of the first data packet is read. The position of the clock is determined based on the first value, and at least one counter within a node is updated upon receipt of a second data packet without reading a second value within the header of the second data packet.

Figure 1:
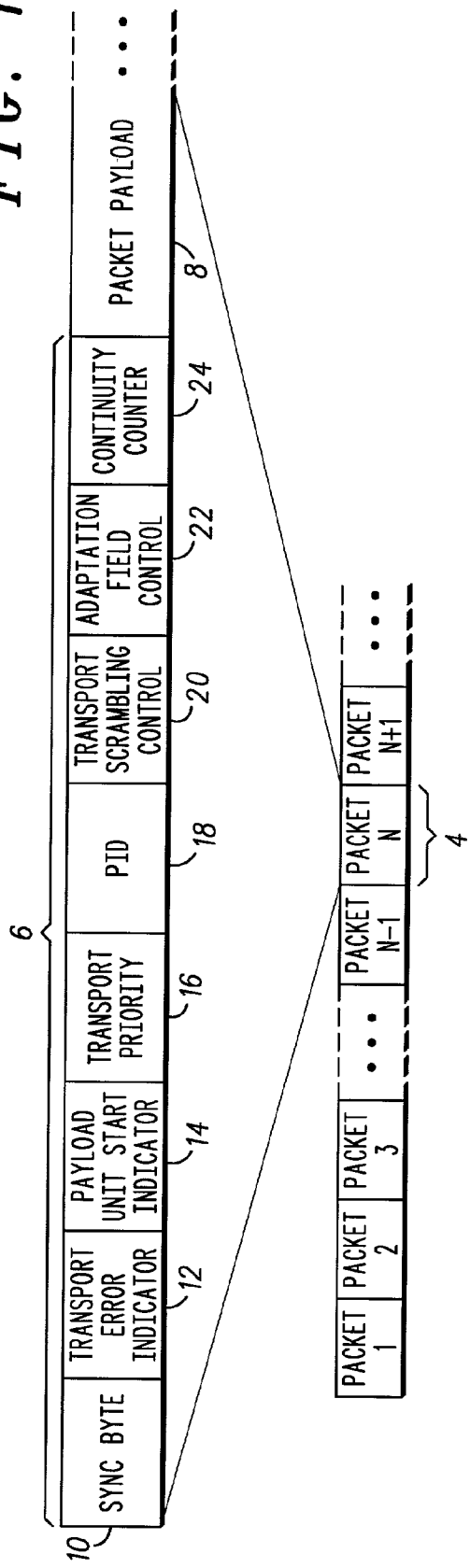
FIG. 1 is a representation of a data stream of packets with an exploded view of a packet header.

Referring now to FIG. 1, a data stream including an MPEG frame 4 is shown with each frame 4 having a header 6 and a payload 8. While various data transmission schemes may be used with the present invention, it is expected that many future communication systems and networks, especially broadband systems, will utilize MPEG as the transmission format. This may include cellular systems, high-speed data access systems, etc. Therefore, for the purposes of this disclosure, MPEG-2 transport stream (TS) packets will be used to illustrate the invention, though this should not be construed as limiting the invention to MPEG-2 or any other version of MPEG. Other types of packets may be used, as is known in the art. Moreover, this should not be construed as limiting the invention to TS packets, as other packet types consistent with this disclosure may also be utilized, as is known in the art.

Each MPEG-2 frame 4 generally includes a 4-byte (32-bit) header 6 at the beginning of the frame 4. The fields of the header 6 may include: an 8-bit Sync Byte 10, a 1-bit Transport Error Indicator 12, a 1-bit Payload Unit Start Indicator 14, a 1-bit Transport Priority field 16, a 13-bit Packet Identification (PID) 18, a 2-bit Transport Scrambling Control 20, a 2-bit Adaptation Field Control 22 and a 4-bit Continuity Counter 24. The payload 8 makes up the rest of the frame 4.

The Sync Byte 10 and the Continuity Counter 24 will be described in further detail below. The remaining fields are described briefly as follows. The Transport Error Indicator 12 is reset to "0" by the sender and set to "1" to indicate that an error has occurred in the reception of the packet. This may be due to an uncorrectably high raw bit error rate. The Payload Unit Start Indicator 14 is used for MPEG specific packets and indicates the beginning of the payload 8. The Transport Priority 16 indicates the priority of the frame 4 as compared to other frames having the same PID 18. Normally, this is set to "0." The PID 18 is used to uniquely identify the stream to which the frame 4 belongs when multiplexed with other streams. The PID 18 allows a receiver to differentiate the stream to which each received frame 4 belongs and indicates the type of data stored in the payload 8. The data can then be reconstructed from a multiplexed stream. A fixed value may be assigned to the PID 18 to indicate a particular type of traffic (e.g., 4th generation cellular traffic). The Transport Scrambling Control 20 indicates the scrambling code of the payload 8. "00" indicates no scrambling. The Adaptation Field Control 22 indicates whether the header 6 is followed by an optional Adaptation Field (not shown). If set to "01" there is no Adaptation Field, only the payload 8. The Adaptation Field is not part of the header 6, but rather is part of the payload 8. The Adaptation Field may contain an optional program clock reference (PCR), which allows the decoder to synchronize its clock to the same rate as the original encoder clock by controlling the frequency of the decoder's system clock. Thus, the PCR is used to match the decoder's system clock frequency to the encoder's system clock in order to synchronize the decoding and playback of a program, and avoid overflow or underflow of the decoder's buffers. The PCR is essentially a time stamp and does not define a common clock for time synchronization.

As it is often standard in the MPEG-2 header, the first byte of an MPEG frame is the Sync Byte 10. The Sync Byte 10 is used for frame synchronization by defining frame boundaries, and synchronizing decoders to the MPEG data stream for random access to the data stream. The decoder uses the Sync Byte 10 to synchronize its internal circuits to the incoming frames 4. The header 6 and payload 8 may then be deserialized to allow a decoder to reconstruct the data for use by the receiving node. However, this does not act as a common clock for use by the two or more communicating nodes for time synchronization. It merely identifies the boundaries of a frame for frame synchronization and proper decoding. The Sync Byte 10 of every 8th frame is bit-wise inverted, beginning with the first data frame 4. For example, if the Sync Byte 10 is 47 (hexadecimal) then every 8th frame the Sync Byte will be B8 (hexadecimal). This resets the energy dispersal randomization function used to randomize the data stream for spectrum shaping purposes. It further provides for frame synchronization.

In the present invention, the detection of the Sync Byte 10 may act as the "tick" of the common clock to indicate the beginning of a new frame 4. Table 1 provides an example of times between Sync Bytes 10 or "ticks." This time is dependent on the data rate of the channel, such that as the data stream is transmitted faster there is a greater occurrence of data frames, and hence Sync Bytes 10, within a given amount of time. As Table 1 shows, the faster the data rate, the smaller the tick rate or the smaller the amount of time between Sync Bytes 10. This characteristic proves to be advantageous to the present invention, since the detection of a frame provides the "tick" of the clock, and the faster the frames 4 are transmitted, the higher the granularity of the clock. While the Sync Byte provides a convenient way of determining the occurrence of a frame 4 in an MPEG transmission format, other means of detecting the occurrence of a new frame 4 may be used, as known in the art.

TABLE 1

| Data Rate (Mbps) | 5 | 10 | 20 | 30 |
|---|---|---|---|---|
| Interval between Sync Bytes (μsec) | 326.4 | 163.2 | 81.6 | 54.4 |

The Continuity Counter 24 in an MPEG frame is a 4-bit modulo-16 counter that increments with each data stream frame 4 having the same PID 18. It is normally used to determine if any frames 4 are lost, repeated or out of sequence. However, the Continuity Counter 24 in the present invention is utilized in a manner that defines a common clock that provides time synchronization of nodes within a network. That is, a counter within the header of a data stream packet is used to define a common clock for synchronizing nodes. All other fields within the MPEG header 6 are pre-specified and the MPEG standard does not permit redefinition of those fields. The Continuity Counter 24, on the other hand, can be redefined without causing disruption to other transmission streams.

Figure 2:
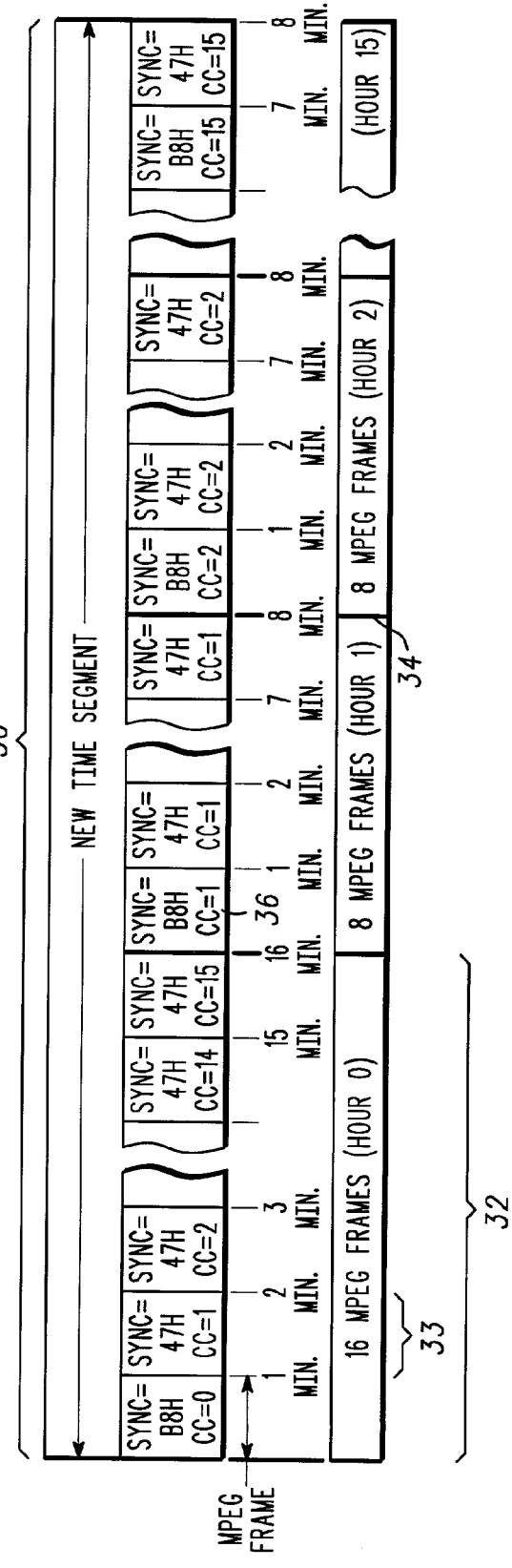
FIG. 2 is a timeline of a common clock according to a first embodiment.

FIG. 2 is an embodiment of one manner in which the Continuity Counter (CC) 24 may be used as a timer to define a common clock within an MPEG data stream for synchronization between nodes that are sending and receiving the data stream. In this embodiment, at least part of the data stream can be considered a time segment 30, which may be variable in length. In this embodiment, it is assumed that the Continuity Counter 24 is not required to be used or decoded in the transmission end and therefore can be modified.

The time segment 30 may further be divided into "hours" 32. The time segment 30 may then be considered analogous to a "day" defined by the number of hours 32 making up the time segment 30. Each hour 32 may then be defined by a number of frames 4, which may be considered analogous to "minutes" 33, and separated by an hour boundary 34. Using the MPEG format, a convenient way of defining the hour boundary 34 is to use the Inverted Sync Byte 36 which occurs every eight frames. Thus every hour 32 may consist of eight MPEG frames 4 with the Inverted Sync Byte 36 occurring in the first frame of every hour 32. The exception to this is the first hour of the time segment 30 since the first hour is sixteen frames long. In subsequent hours, the Sync Byte 10 may be used to indicate that a new hour 32 has begun.

As shown in FIG. 2, the first hour consists of sixteen frames 4 (or minutes 33) with the remaining hours consisting of eight minutes 33 apiece. While the length of the first hour can also be varied between the minimum and maximum values of the counter, the use of sixteen MPEG frames has been found to provide a high probability of synchronization in a relatively short amount of time while maintaining compatibility with both the modulo-16 Continuity Counter 24 and the Inverted Sync Byte 36. In other words, the node is able to synchronize faster in the first hour. The Inverted Sync Byte 36 still occurs at the eighth frame in the first hour, but it is ignored for purposes of detecting the hour boundaries 34. For each minute 33 that occurs in the first hour, the Continuity Counter 24 is incremented for each MPEG frame 4. Since the Continuity Counter 24 in an MPEG-2 header 6 only counts from zero to fifteen, the maximum number of minutes 33 in the first hour is sixteen and hence the maximum number of frames is sixteen. For each subsequent hour, the Continuity Counter 24 is incremented only at an hour boundary 34 and remains unchanged for the remainder of the hour 32. The Continuity Counter 24 only has a value of zero in the first frame of the first hour to signify the beginning of a new time segment 30.

By changing the Continuity Counter 24 during the first hour, a receiving node is able to detect time within just a few MPEG frames. The node may synchronize immediately upon detecting the first frame of the first hour since this is the only time the value of the Continuity Counter is zero (CC=0). However, if a node does not synchronize at the beginning of the time segment 30, it may do so within just a few frames anywhere within the time segment 30 by comparing the values of the Continuity Counter 24 for successive frames 4. For example, if the node attempts synchronization during the third frame of the first hour (Hour 0, CC=2), it will be able to read at the fourth frame (Hour 0, CC=3) that the Continuity Counter 24 is changing. From the node's standpoint, this could either be because it just read the fourth minute of the first hour or because the hour boundary 34 was just crossed between the third hour (Hour 2, CC=2) and the fourth hour (Hour 3, CC=3). At the fifth frame of the first hour (CC=4), the node would realize that the Continuity Counter 24 is still changing. This allows the node to distinguish between the first hour and subsequent hours since after the first hour the Continuity Counter does not change for three successive frames 4. The node may then read the value of the Continuity Counter 24 to determine the minute 33. Thus, by just comparing successive values of the Continuity Counter 24, the node is able to synchronize to the hour 32 and minute 33 of the common clock within just a few frames of the first hour.

In subsequent hours, the Continuity Counter 24 is not incremented and its value is directly associated with the hour 32. However, a node that has already been able to synchronize its internal clock in the first hour is able to track the minutes 33 by incrementing its internal minute counter at each detection of the MPEG frame Sync Byte 10. The node may also track the hour 32 by resetting its internal minute counter and incrementing its hour counter after the number of minutes 33 making up an hour 32 has passed. In an alternative method, the Inverted Sync Byte 36 is used to signify the hour boundaries 34 where each hour 32 is eight frames long. The node may then track the hour 32 by incrementing its hour counter at the detection of an Inverted Sync Byte 36.

If the receiving node has not synchronized its internal clock at the first hour, it may synchronize its clock at subsequent hours. For example, if a node attempts to synchronize during the second hour (hour 1, CC=1), it is able to determine that the hour 32 is other than the first hour by reading the Continuity Counter 24 of successive frames. Since the value of the Continuity Counter 24 does not change for each minute 33 after the first hour, the node knows that it is not the first hour and determines the hour 32 by reading the value of the Continuity Counter 24 (i.e., CC=1 so Hour=1 which is the second hour). While the node knows the hour 32 and may be able to detect the occurrence of minutes 33 as they pass, the node is does not know whether it is the first minute, second minute, etc. of the second hour. However, upon approaching an hour boundary 34 the Continuity Counter 24 value changes, which indicates to the node that it is a new hour 32. In the present example, the node determines that it has crossed the hour boundary 34 into the third hour (Hour 2, CC=2). Therefore, the first frame must be the first minute. In this manner, a node that does not synchronize its clock in the first hour is able to determine any subsequent hour within only a couple of frames 4 and determine the exact minute 33 at an hour boundary 34, which occurs in seven frames or less according to the example given. Alternatively, the node may detect a new hour 32 and determine the minute 33 by detecting the Inverted Sync Byte 36.

If the receiving node attempts to synchronize at an hour boundary 34 (e.g., the eighth frame of the second hour), it may determine that it is in a new hour 32 by either detecting the change in the Continuity Counter 24 or detecting the Inverted Sync Byte 36 of the next frame 4. By detecting the change of the Continuity Counter 24 at the hour boundary 34, the node determines that it is either entering a new hour 32 or that it is entering a new minute 33 within the first hour, since the Continuity Counter 24 changes with successive frames 4 at both times. However, upon receiving the next frame 4, the node determines that the Continuity Counter 24 has not changed its count from the previous frame 4. This distinguishes a subsequent hour from the first hour where the Continuity Counter 24 changes for each minute 33 in the first hour. Therefore, the node may read the value of the Continuity Counter 24 to determine the hour 32. Since the node may track the number of minutes 33 since the Continuity Counter 24 changed (i.e., the number of minutes 33 since the hour boundary 34), the node also knows the exact minute 33. Again, the node is able to synchronize to the hour 32 and minute 33 of the common clock within just a few frames 4.

If the receiving node attempts to synchronize at an hour boundary 34 as above and uses the Inverted Sync Byte 36 to determine the hour boundary 34, it is able to determine the hour 32 by reading the value of the Continuity Counter 24 of the first frame of the new hour 32. The node also synchronizes to the minute 33 since the first frame of a new hour 32 is the first minute. It should be noted that with this example there are two locations in the time segment 30 where the values of the Continuity Counter 24 and the occurrence of the Inverted Sync Byte 36 are the same. These occur: (1) between the eighth minute (CC=7) and ninth minute (CC=8) of the first hour where the Inverted Sync Byte occurs at the ninth minute, and (2) between the eighth hour (CC=7) and ninth hour (CC=8) where the Inverted Sync Byte 36 occurs at the beginning of the ninth hour. To avoid a misread of the clock, the receiving node may need to read the Continuity Counter 24 of at least one more frame 4 to determine the hour 32 and minute 33. However, this also requires no more than a few frames to achieve synchronization.

Since the Continuity Counter 24 of an MPEG header 6 is modulo-16, the maximum length of the time segment 30 is sixteen hours 32. When the transmitting node begins a new time segment 30, it sets the Continuity Counter 24 in the MPEG header to zero. This may also be done automatically if the length of the time segment 30 is sixteen hours 32 given that the Continuity Counter 24 resets itself after a count of sixteen as a matter of course. However, the size of the time segment is variable, so the transmitting node may have to reset the value of the Continuity Counter 24. The new time segment 30 may then follow the same pattern for varying the value of the Continuity Counter as described above. To use the system above, the maximum size of a time segment should be less than the product of: (hours per time segment+1) times the number of frames per hour times the transmission time for an MPEG frame. Thus, at 30 Mbps, the time segments 30 would be around 7 seconds each. The addition of "1" to the number of hours per time segment is needed, since the first hour in the above example is twice as long as subsequent hours.

The above has described a possible embodiment for modifying the header 6 to use a counter to define a common clock for synchronizing nodes. Such modifications to the header 6 of a data frame 4 may be performed at the transmitting node. For example, in a cellular communication system, a first mobile unit transmits a data stream containing the information to be transmitted. At this point, the Continuity Counter 24 may still be used as it normally would by incrementing for every transmitted frame to determine if any frames are missing, out-of-order, etc. The mobile unit needs to communicate with a base-station in order to complete the signal to a second mobile unit. The base-station may then modify the Continuity Counter 24 as described above to provide synchronization to the second mobile unit. Any upstream signal from the base station to the first mobile unit, or a data stream from the second mobile unit intended for the first mobile unit, may also be modified by the base station to provide synchronization to the first mobile unit. Such a method of synchronization is also applicable to hard-wire networks such as computer networks and the like which consists of multiple transmitting and receiving nodes.

Figure 3:
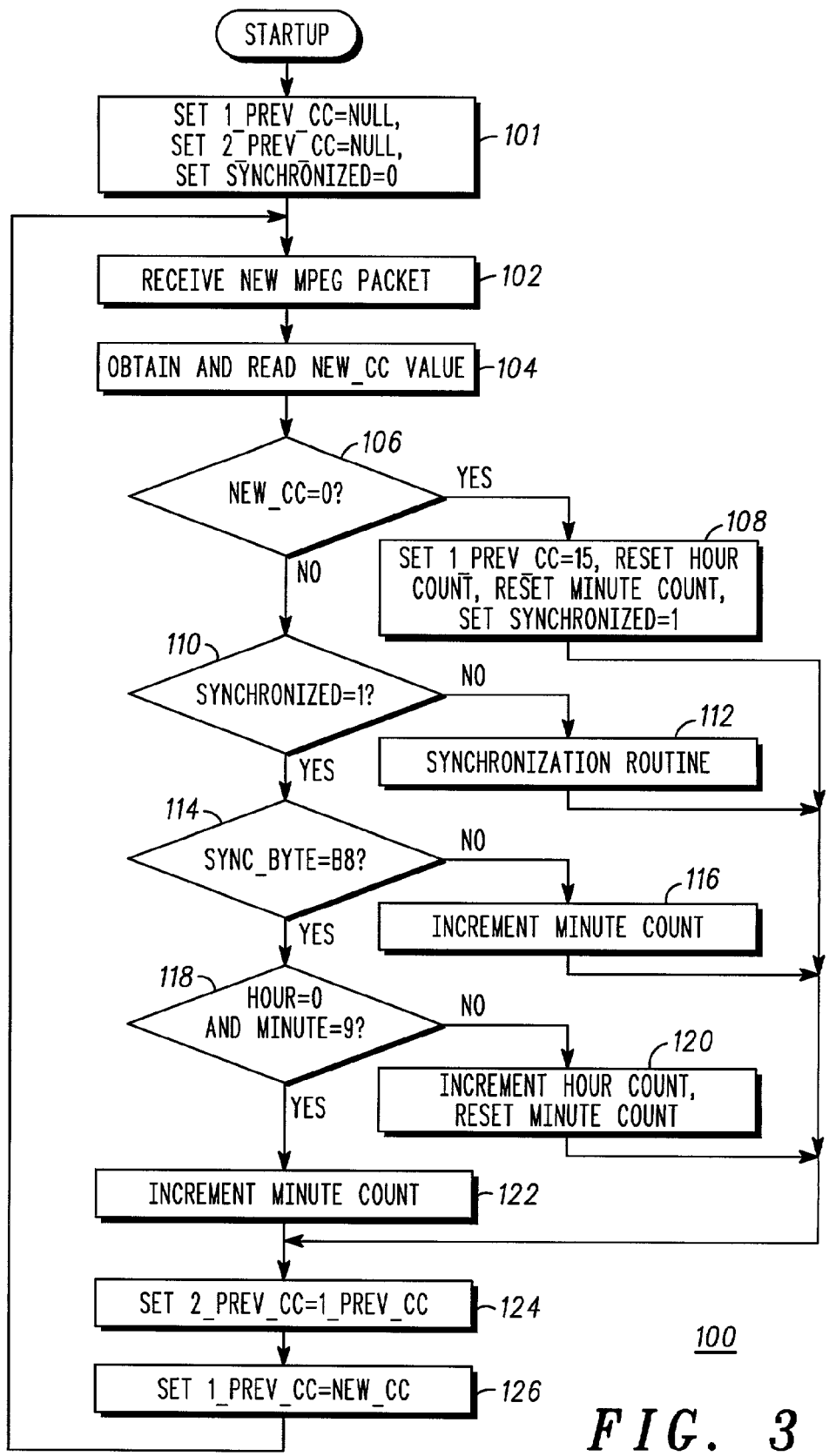
FIG. 3 is a flow chart depicting the steps performed by a receiving node in tracking the clock of FIG. 2.

FIG. 3 depicts a main routine 100 that may be implemented in a receiving node to track the hour 32 and minute 33 of the common clock according to the above embodiment, and hence obtain and maintain synchronization with the transmitting node. Referring to FIG. 3, the receiving node stores the previous value of the Continuity Counter 24, represented by "1_Prev_CC" and referred to herein as "the first previous value." The node may store the Continuity Counter value preceding the first previous value, represented as "2_Prev_CC" and referred to herein as "the second previous value." The node also keeps track of whether it has already synchronized, represented by variable "Synchronized." "Synchronized" is set to "1" if there is synchronization or set to "0" if there is no synchronization. When the node starts, it is in an initialization state 101. In this state, the node has not received any MPEG frames and has not synchronized. Therefore, the node initializes "1_Prev_CC" and "2_Prev_CC" to "Null" and "Synchronized" to "0."

The receiving node then receives a new MPEG frame 4 with a header 6 having a modified Continuity Counter 24 at block 102. The receiving node reads the new Continuity Counter 24 value (CC), represented by "New_CC" and referred to herein as "the new value," at block 104, and determines if the new value is zero at block 106 which indicates a new time segment 30 has begun. If the new value is zero, the node synchronizes with the other nodes in the network by resetting its internal hour and minute counters, and setting Synchronized to "1" at block 108. As shown in FIG. 2, the only time the Continuity Counter is zero is at the beginning of a time segment 30. If the receiving node is able to read the first frame to determine that the Continuity Counter 24 is at zero, then the node is already synchronized. At the beginning of a time segment 30, the first previous value is set to the maximum number of hours 32 that may be in a time segment, in this case fifteen. Hence, the receiving node sets "1_Prev_CC" to "15" in block 108.

Following block 108, the second previous value is set equal to the first previous value at block 124. In the present example, this would be fifteen. The first previous value is then set to the new value (e.g., zero) at block 126, and the process begins again with the receipt of a new data frame 4. Blocks 126 and 124 are used respectively to update the first and second previous values for the receipt of the next frame 4 and the new value. This updating may be done at the completion of each analysis of each frame 4 so as to prepare for the next frame 4. As will be shown, these updates may be used for comparisons to determine the time in the middle of a segment 30. They may also be used in the main routine 100 to resolve the potential discrepancy involving the Inverted Sync Byte 36, as described above.

At block 110, the node determines whether it has already synchronized. "Synchronized" may be set to "1" upon completion of the synchronization routine 112 or at block 108 if at the beginning of a new time segment 30. If there is no synchronization, the routine 100 performs a synchronization routine 112, which will be described below. If there is already synchronization, then ideally the receiving node need only increment its internal counters to track the hour 32 and minute 33 of the clock. In order the track the hour 32, the node may look for the Inverted Sync Byte 36 at block 114 to detect the presence of a new hour 32. If the current frame 4 does not have an Inverted Sync Byte 36, then the node increments its minute counter at block 116 to track the minutes 33.

The node may also use the Inverted Sync Byte 36 to verify synchronization is maintained. For example, since the Inverted Sync Byte 36 occurs every eight frames 4, the node can check to see if eight minutes 33 have passed since the last Inverted Sync Byte 36. If not, then the node can attempt to re-synchronize at block 112 or wait for a new segment 30 to begin.

If the node does detect an Inverted Sync Byte 36 at block 114, then it must distinguish between a new hour 32 and the Inverted Sync Byte 36 occurring in the middle of the first hour. To resolve this, the main routine 100 checks if it is in the first hour (Hour=0) and if it is at the ninth minute (CC=8) at block 118. If so, this is the "false hour boundary" in the first hour. If the condition at block 118 is false, then it is a new hour 32. The hour counter is incremented and the minute counter is reset at block 120. If it is the middle of the first hour, then the Inverted Sync Byte 36 is ignored and the minute counter is incremented at block 122.

The Inverted Sync Byte 36 is not necessary to determine the occurrence of a new hour 32. As shown below, the node may determine the exact hour 32 and minute 33 at any point in the time segment 30 using only the values of the Continuity Counter 24. The following also describes how the node may synchronize at block 112 if synchronization does not occur at the beginning of the time segment 30.

Figure 4:
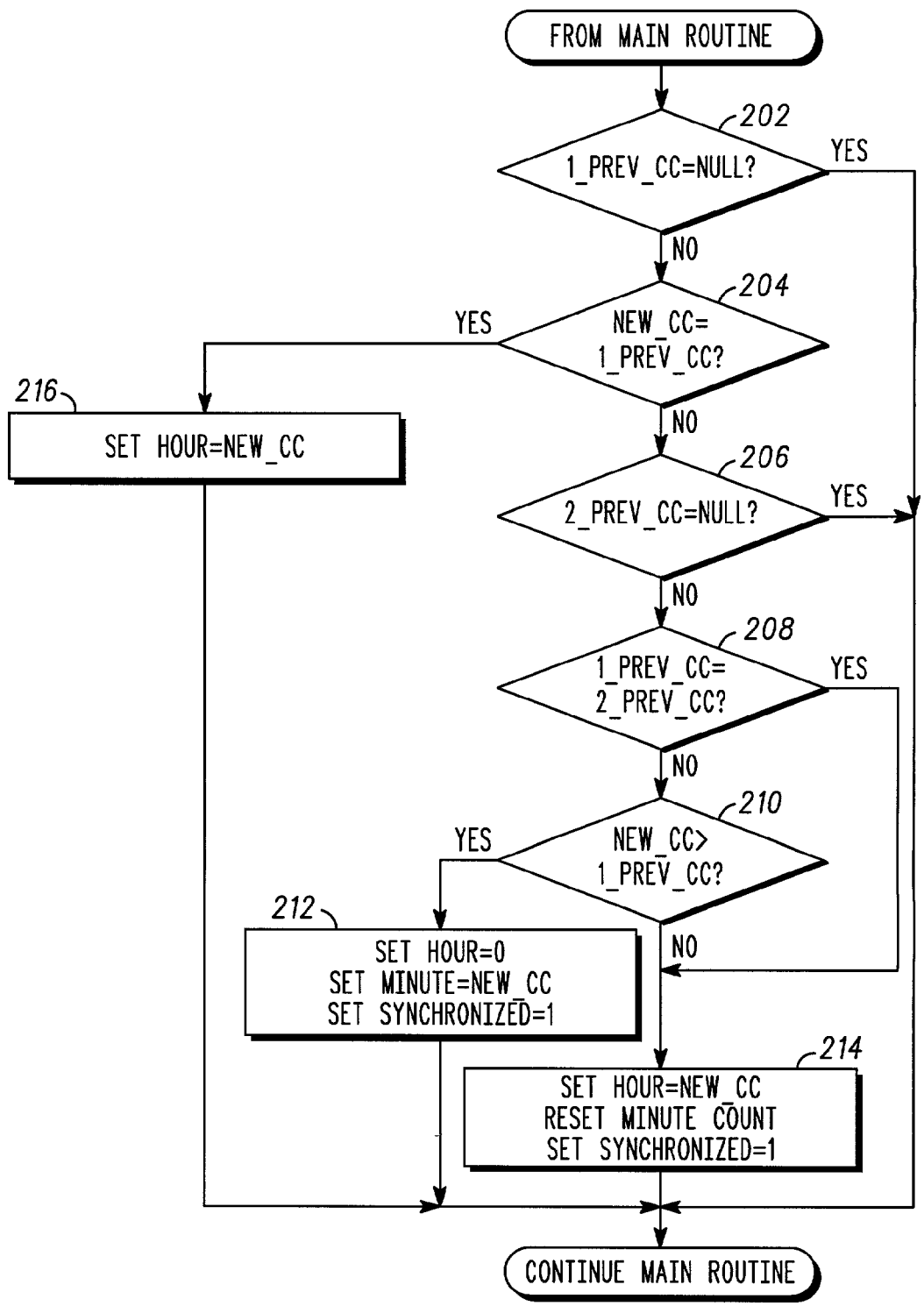
FIG. 4 is a flow chart depicting the steps performed by a receiving node in synchronizing to the clock of FIG. 2.

FIG. 4 is a flowchart that depicts a simple synchronization routine 112 for synchronizing the nodes at a time other that the beginning of the time segment 30. For synchronization in the middle of the first hour, the receiving node receives a new value that is not zero (e.g., N) which is noted at block 106 of the main routine 100. Block 202 is used to determine whether the first previous value is a null value (i.e., whether a first previous value exists). This may occur if the node is trying to synchronize but has only received one frame 4. As mentioned above, it may take a few frames 4 for the node to synchronize since new values may need to be compared with previous values to determine the time. Therefore, if a first previous value does not exist, the node needs to read at least one more frame 4 to determine the time. Thus, the first previous value is updated at block 126 and the node reads the next frame at block 102.

Assuming a first previous value does exist (e.g., N−1), the synchronization routine 112 compares the new value to the first previous value at block 204. Since the values are not the same in this scenario, it means that the Continuity Counter 24 is changing thereby indicating the time is either in the first hour or at an hour boundary 34. To differentiate between the two, the node determines how long the Continuity Counter 24 has been changing by looking at the second previous value (e.g., N−2). However, it must be determined at block 206 that a second previous value exists, similar to that done at block 202. If a second previous value is null, the node is still not able to be synchronized and returns to the main routine 100. The second previous value is set to the first previous value at block 124, and the first previous value is updated at block 126. The next frame 4 is then read at block 102 and the main routine 100 with the synchronization routine 112 is repeated.

If the second previous value is not null, the first previous value is compared to the second previous value at block 208 to distinguish between the First hour and an hour boundary 34. By comparing the first previous value to the second previous value at block 208, the synchronization routine 112 determines for how long the Continuity Counter 24 has been changing. In this example, the node is trying to synchronize in the middle of the first hour when the Continuity Counter 24 changes for every frame 4. Therefore, the first previous value and the second previous value would not be the same. The new value (N), the first previous value (N−1) and the second previous value (N−2) are all different at the first hour and at the first hour boundary into the second hour, so the values are quantified beyond just determining if they are the same or different. Block 210 is used to determine how the new value and the first previous value are different. In the first hour the new value is greater than the first previous value, so the node is able to determine that it is in the first hour. It sets the hour 32 to zero (the first hour), sets the minute count to the new value, and sets "Synchronized" to one, at block 212. The synchronization routine 112 has now synchronized in the middle of the first hour within just a few frames 4.

If however, the new value is not greater than the first previous value as determined at block 210, then the clock has just crossed the hour boundary 34 into the second hour (i.e., 1_Prev_CC=15 and New_CC=1). The hour 32 is the value of the Continuity Counter 24 (i.e., CC=1 which is the second hour). Since the second hour has just begun, the minute counter is reset at block 214. Also since the node is synchronized, "Synchronized" is set to one at block 214. The node now knows the time to within the hour 32 and the minute 33 of the clock.

The receiving node may also synchronize during the middle of an hour 32 other than the first hour. Returning to block 204, the synchronization routine 112 determines the hour 32 by comparing the new value (e.g., N) to the first previous value (e.g., N−1). Since the Continuity Counter 24 does not change during the second and subsequent hours of a time segment 30, the new value and the first previous value are the same. The hour 32 is then set to the new value at block 216. At this point, the node has determined the hour 32, but has not determined the minute 33. As explained above, the node may need to receive more frames 4 until it reaches an hour boundary 34 in order to determine the exact minute 33. Until then, the synchronization routine 112 increments the minute count to follow along with the "tick" of the clock.

At an hour boundary 34, the receiving node is able to synchronize to the minute 33 since the beginning of an hour 32 resets the receiving node's internal minute counter. As mentioned above, the Inverted Sync Byte 36 may be used to detect the hour boundary 34. However, as shown by FIG. 4, the use of the Inverted Sync Byte 36 to determine hour boundaries 34 is not required, and may be done by comparing values of the Continuity Counter 24. At an hour boundary 34, the new value is changed and will not be equal to the first previous value, as determined at block 204. Assuming a second previous value exists, the first previous value is found to be equal to the second previous value at block 208, thereby showing that the Continuity Counter 24 had only recently changed. This indicates an hour boundary 34, other than the one between the first and second hour. The node then sets the hour 32 to the new value and resets the minute counter at block 214. A similar method of monitoring the change in the hour 32 may be implemented in the main routine 100 in place of monitoring for an Inverted Sync Byte 36 at block 114.

As shown by the above examples, a receiving node is able to synchronize with a transmitting node at any point during the variable length time segment 30. Once the node has synchronized with the other nodes in the network, the receiving node may use the main routine 100 to track the time and monitor whether synchronization has been maintained.

The size of the time segment 30 may be varied, and thus the size of the day may also be varied. Since the Continuity Counter 24 is a 4-bit counter, it is able to count from zero to fifteen (0000-1111), thus providing anywhere between one and sixteen hours 32 in a given "day". As the limits of other counters may vary, so too may the maximum number of hours 32 in a given day. Once the counter reaches its maximum value, in this case fifteen for the Continuity Counter 24, the time segment 30 is at an end. The Continuity Counter 24 is reset to zero to begin a new time segment 30. However, the time segment 30 may be less than sixteen hours 32 even if the Continuity Counter 24 runs from zero to fifteen.

The embodiment described above is for variable length time segments 30. The transmitting node may inform the other nodes in the network about the length of a segment in a Media Access Control (MAC) layer message. Alternatively, the nodes may simply detect when the Continuity Counter 24 s zero in order to know when a new time segment 30 has begun, as described above.

By modifying the Continuity Counter 24 in the manner described above there may be ramifications that occur through multiplexing multiple streams, unless all streams have the counter modified in the same manner. If all of the information in the data stream being transmitted within the network is of the same type, and hence all have the same PID 18, then there is no problem in multiplexing the data stream with another data stream having a different information type, and thus a different PID 18. This is because the receiving node is able to associate each frame with a particular data stream using the PID 18, and thus distinguish between MPEG streams with and without a modified Continuity Counter 24. The modified Continuity Counter 24 only influences frames 4 belonging to the same network packets (i.e., the same PID 18).

However, the data stream with the Continuity Counter 24 modified as above should not be multiplexed with other streams having the same PID 18 without having modified the Continuity Counter 24 in a similar manner. Otherwise, the receiving node may be unable to differentiate between the Continuity Counter 24 of the stream with the common clock and the Continuity Counter 24 of the stream without the common clock. Furthermore, some receiving nodes require the use of the Continuity Counter 24 in its standard format in order to properly accept and read the data in the payload 8. One method of overcoming these problems involves hiding the actual value of the unmodified Continuity Counter 24 within the most significant nibble of the PID 18. That is, the value of the Continuity Counter 24 before modification may be temporarily stored in the first four bits of the leading edge of the PID 18 of each frame 4.

Alternatively, the potential difficulties described above may be overcome in a second embodiment of the invention. Referring to FIG. 5, the Continuity Counter (CC) 24 may be used in its standard format by incrementing for each successive frame 4 while also defining a common clock for synchronization between nodes. The time segment 300 is of fixed length as opposed to variable length.

For example, the time segment 300 may be defined as sixteen frames 4 long. Each frame 4 is still considered a minute 302, and in this embodiment each time segment 300 is an hour with sixteen minutes 302, similar to the first hour of the above embodiment. Each of the receiving nodes may be preprogrammed with the length of the time segment 300 beforehand. Alternatively, the node may be informed of the length of the time segment 300 at the beginning of the transmission, such as during the registration process.

The nodes are aware of the boundaries of the time segments 300 once they initialize their internal clock to the clock of the transmitting node, since each time segment 300 length is of a fixed duration. With the embodiment utilizing the variable length time segment 30, the node is never sure when the time segment 30 may end and thus must constantly monitor the transmission to know when a new time segment 30 will begin. By being aware of the segment boundaries, the nodes may "sleep" for purposes of power conservation. That is, the node does not need to continually monitor the transmission. It may use its internal counters to monitor when a new time segment 300 is approaching and switch on close to that boundary. The node may be able to automatically initialize to the minute 302 by reading the value of the Continuity Counter 24. The node always knows what hour it is, since there is only one hour in the time segment 300 and hence only one hour in the day.

The length of the time segment may have ramifications in the Media Access Control (MAC) layer, though not in the physical layer of the transmission. For example, the MAC layer may use the common clock for scheduling traffic in the upstream direction. The duration of each time segment 30 determines how often a node, such as a base-station in a cellular system, needs to transmit an access schedule and for how long the schedule is valid. As described above, the common clock "rolls over" at the boundary of each time segment. Since there is no differentiation between time segments, time is only unique for a time segment 30 duration. No history is kept of the particular "day," "week" or "month." Unless nodes keep track of the time segment count, which is akin to tracking the day, time will not be unique beyond a time segment 30 duration period, though it should be noted that it is not critical for the node to keep a history of what "day" it is, so long as the node tracks time relative to the beginning of a time segment. That is, the node does not need to know if it is transmitting the first time segment or the Nth time segment. It is only expected that the node will track the hour and minute of the clock, which is enough for purposes of synchronizing nodes.

However, it is possible to further program the node to track levels higher than just hours or minutes thereby providing the node with a greater history of time and making time unique over a longer period. This may be accomplished via an internal counter that is able to track the number of "days" that have occurred, or the MPEG header may include or modify an extra bit to indicate the particular "day," "week," "month," etc.

Furthermore, it is possible to provide higher granularity in the common clock. For example, with the embodiments described above, the granularity of the common clock is defined by the data rate of the transmission. If timing is required to be kept at a higher granularity (e.g., seconds), each node could use an-additional high speed counter to track the time since the receipt of the previous frame 4. This internal counter would be reset at the receipt of each new frame 4.

It is possible that channel errors could occur which would lead a node not to detect the receipt of a frame 4 and lose frame synchronization. However, if a node has previously initialized its clock and since it is aware of the signaling rate on the downstream channel, it could automatically update its clock without receiving each frame 4. The only event that a node may not be aware of is when a variable time segment 30 ends and a new one begins, which may occur at the discretion of the transmitting node. Once frame synchronization is re-established, the node could correct its internal clock to synchronize with the common clock by waiting for the Continuity Counter 24 to reset, or synchronizing anywhere within the time segment, as described above.

The common clock is applicable to both Frequency Division Duplex (FDD) and Time Division Duplex (TDD) transmissions. The common clock described above assumes that frames are continuously being transmitted in the downstream direction. This makes the clock easily applicable to FDD with continuous stream transmission. However, a node that has already initialized its clock once within a time segment can run its clock autonomously and use it for transmission in the absence of a downstream transmission (i.e., operate in TDD mode). For example, in TDD a base station may not be able to transmit the data stream to the receiving node all the time. Therefore, the base-station may transmit the common clock for only half a millisecond to allow synchronization. The local clock on a receiving node runs for the another half a millisecond based on the synchronization with the base-station. Local clocks are generally accurate for short amounts of time, but become increasingly inaccurate for longer amounts of time. Therefore, the use of the local clock is kept to about half a millisecond until the transmitting node is able to transmit the common clock again.

The above described common clock is further applicable to both cable and wireless media. The synchronization method is not dependent on the transmission media and hence can be used in both wireless systems, such as cellular systems, and cable systems, such as a computer network. Furthermore, the implementation of this scheme is low cost since it may involve only minor modifications to existing MPEG frame synchronization chips, such as an Application Specific Integrated Chip (ASIC), which are generally widely available. The chip used will need to determine the frame 4 boundaries, filter multiplexed streams for a particular PID 18, and use the value of the Continuity Counter 24 to determine the rime of the common clock. The first two requirements are standard and built into MPEG standard chips and ASICs. The latter would need to be added to the chip.

Once the receiving node receives its transmission schedule and synchronizes to the common clock, range resolution may need to be performed by the MAC layer. The node may use an additional counter to compensate for variations in the propagation delay to another node, such as a base-station in a cellular system. This may be used to offset the frame boundaries detected at the node, so that the transmission from the node arrives at the base-station at the appropriate time.

While the present invention has been described with reference to specific examples, which are intended to be illustrative only, and not to be limiting of the invention, it will be apparent to those of ordinary skill in the art that changes, additions and/or deletions may be made to the disclosed embodiments without departing from the spirit and scope of the invention.

What is claimed is:

1. A clock shared by two or more nodes via a data transmission, wherein the data transmission includes a plurality of data packets, each data packet having a header containing a value, the clock comprising:
    a first timing portion including at least two data packets wherein the value is constant for each data packet in the first timing portion; and
    a second timing portion including at least two data packets wherein the value is constant for each data packet in the second timing portion and different from the value for each data packet in the first timing portion.

2. The clock of claim 1, further comprising a third timing portion including at least two data packets wherein the value changes with each data packet.

3. The clock of claim 2, wherein the value of one of the data packets of the third timing portion is unique among all the values of all the timing portions.

4. The clock of claim 2, wherein the value increments for each data packet within the third timing portion.

5. The clock of claim 1, wherein the value increments between the first timing portion and the second timing portion.

6. The clock of claim 1, wherein the value is provided by a counter within the header.

7. The clock of claim 1, wherein the data transmission is in MPEG format and a counter within the header of each MPEG data packet provides the value.

8. The clock of claim 7, wherein the counter within the header is a modified continuity counter.

9. The clock of claim 1, wherein a frame synchronization value defines the boundaries of the first timing portion and the second timing portion.

10. The clock of claim 1 further comprising a plurality of time segments each including at least the first timing portion and the second timing portion.

11. A clock shared by two or more nodes via a data transmission, wherein the data transmission includes a plurality of data packets, each data packet having a header containing a value, the clock comprising:

a first timing portion including at least two data packets wherein the value changes with each data packet in the first timing portion; and one or more subsequent timing portions each including at least two data packets wherein the value is constant for each data packet within a subsequent timing portion and changes with each of the one or more subsequent timing portions.

12. The clock of claim 11, wherein the value of one of the data packets of the first timing portion is unique among all the values of all the timing portions.

13. The clock of claim 11, wherein the value increments for each data packet within the first timing portion.

14. The clock of claim 11, wherein the value increments from one subsequent timing portion to the next.

15. The clock of claim 11, wherein a frame synchronization value defines the boundaries between each of the timing portions.

16. The clock of claim 11 further comprising a plurality of time segments each including the first timing portion and the one or more subsequent timing portions.

17. The clock of claim 16, wherein the number of the one or more subsequent timing portions is variable among the plurality of time segments.

18. A method of time-synchronization between two or more nodes via a clock embedded within a data communication, wherein the clock is provided by at least one time segment including two or more data packets, each data packet having a header containing a value that changes with each data packet, the method comprising:

receiving information on the length of the at least one time segment;

determining the boundary of each time segment based on the information;

receiving a first data packet;

reading a first value within the header of the first data packet;

determining the position of the clock based on the first value; and updating at least one counter within a node upon receipt of a second data packet without reading a second value within the header of the second data packet.

19. The method of time-synchronization of claim 18 further comprising:

receiving a third data packet;

reading a third value within the header of the third data packet if the third data packet is near the boundary of the time segment; and resetting the at least one counter upon crossing the boundary of the time segment.

* * * * *